United States Patent [19]

Turenchalk, Sr.

[11] 4,304,121

[45] Dec. 8, 1981

[54] APPARATUS AND METHOD FOR A GYROSCOPIC EFFECT TEST

[76] Inventor: John Turenchalk, Sr., P.O. Box 158, Rte. 403, Dixonville, Pa. 15734

[21] Appl. No.: 20,450

[22] Filed: Mar. 14, 1979

[51] Int. Cl.³ .......................................... G01N 33/22
[52] U.S. Cl. ................................................. 73/35
[58] Field of Search ............... 73/382 R, 382 G, 504, 73/35, 167, 1 E; 35/19 R; 116/200, 201

[56] References Cited

U.S. PATENT DOCUMENTS

| 1,186,339 | 6/1916 | Schuler | 33/324 X |
| 1,987,763 | 1/1935 | Tea | 35/19 R |
| 3,157,837 | 11/1964 | Andres | |
| 3,533,187 | 10/1970 | Campbell | |
| 3,548,507 | 12/1970 | Mueller | 33/322 |
| 3,726,146 | 4/1973 | Mishler | |
| 4,034,488 | 7/1977 | Trujillo | |
| 4,074,443 | 2/1978 | Wilkerson | |

FOREIGN PATENT DOCUMENTS 47709 9/1977 U.S.S.R. .............................. 35/19 R

Primary Examiner—Charles A. Ruehl
Attorney, Agent, or Firm—Victor J. Evans & Co.

[57] ABSTRACT

Disclosed herein is an apparatus and method for performing a test with a gyroscope in which the apparatus defines a pair of gyroscopes suitably fashioned to rotate in opposed directions, a substrate supporting said gyroscopes, and a bell jar overlying the gyroscopes, along with structure to constrain the bell jar on the substrate. The method disclosed for use with the apparatus includes the steps of spinning up both gyroscopes in opposing directions, securing the bell jar thereover, and providing an energy disturbance a reasonable distance from the apparatus so as to observe any precession which might take place with the gyroscopes due to the energy disturbance.

5 Claims, 6 Drawing Figures

APPARATUS AND METHOD FOR A GYROSCOPIC EFFECT TEST

BACKGROUND OF THE INVENTION

Gyroscopes have been known to exist for quite some time, and their use in aviation, ships, and missles and the like for systems guidance should not be confused with the apparatus according to the present invention.

The following five patents reflect the state of the art as is known to applicant, but none appear to touch on the invention according to the present application.

U.S. Pat. No. 3,157,837 Andres
U.S. Pat. No. 3,533,187 Campbell
U.S. Pat. No. 3,726,146 Mishler
U.S. Pat. No. 4,034,488 Trujillo
U.S. Pat. No. 4,074,443 Wilkerson Campbell teaches the use of a power integrated gyroscopic device in which the spin up mechanism is integral with the gyroscope, and it is to be noted that precession of the major axis of the gyroscope can not be observed since this axis is constrained whereby tendencies of this axis to precess will not be directly observable.

SUMMARY OF THE INVENTION

Accordingly, an object of this invention is to provide a gyroscopic testing device which is substantially removed from external forces of influence except that which is under testing, and to this end a pair of gyroscopes is utilized each rotating in a direction opposite from the other.

A further object is to provide an apparatus for testing the effect and change in gravity that occurs when a sudden and enormous transferral of energy takes place, in which that energy released or transferred may correspond to that which is released during an hydrogen or atomic bomb blast.

A further object is to provide a microcosm which parallels the effect the sun or stars produce on the earth, since their relative rotations and mass produce a demonstrable gyroscopic effect which may be simulated via a test of the character disclosed hereinafter.

A further object contemplates providing evidence which would suggest that the force of gravity varies as a function of the matter which generates the gravity and therefore gravity is not a spontaneous phenomina.

These and other objects will be made manifest when considering the following detailed specification and drawings.

BRIEF DESCRIPTION OF THE PREFERRED EMBODIMENT

Figure 1:
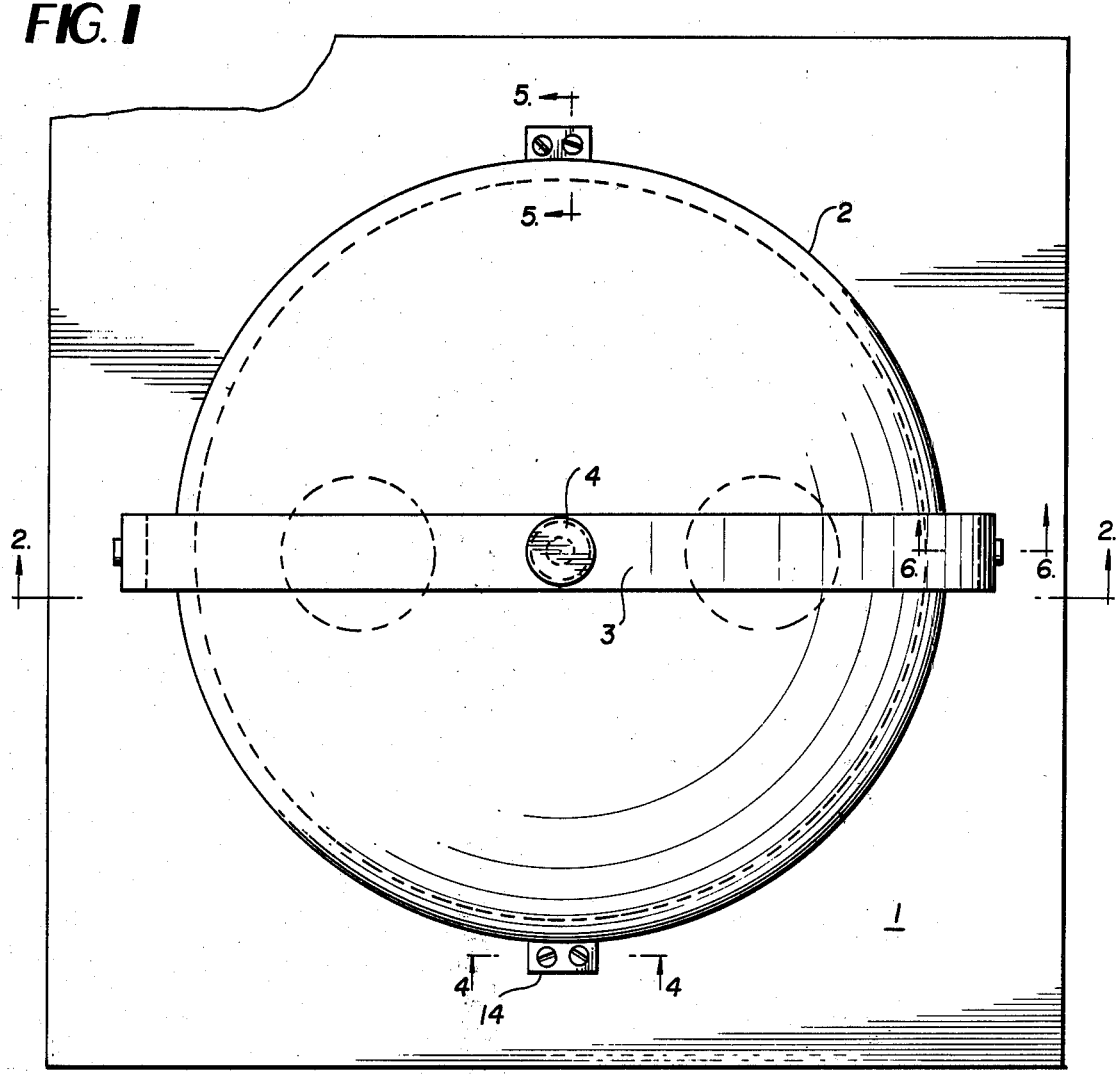
FIG. 1 is a top plan view of the apparatus according to the present invention.
Figure 2:
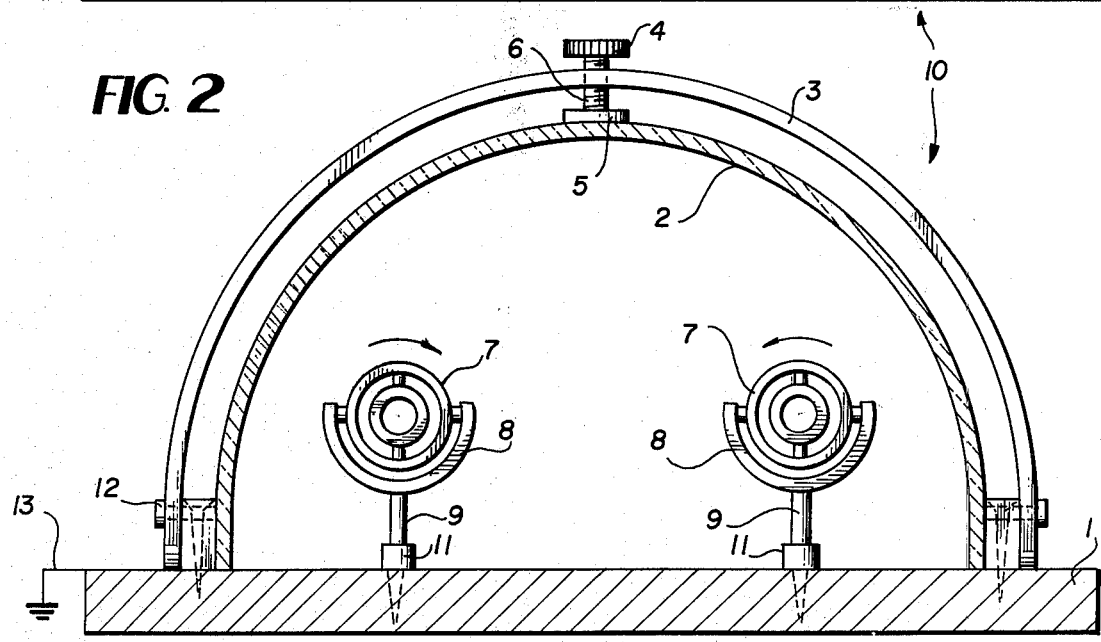
FIG. 2 is a sectional view taken along lines 2—2 of FIG. 1.
Figure 3:
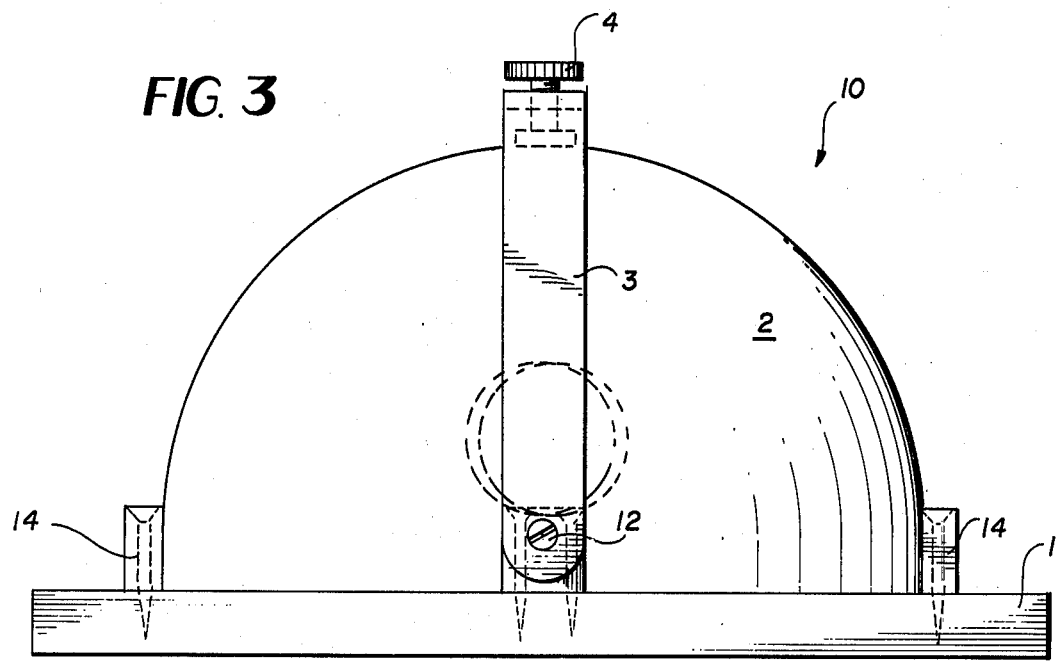
FIG. 3 is an end view of the apparatus according to the present invention.
Figure 4:
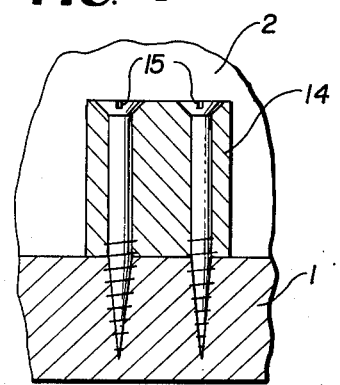
FIG. 4 is a sectional view taken along lines 4—4 of FIG. 1.
Figure 5:
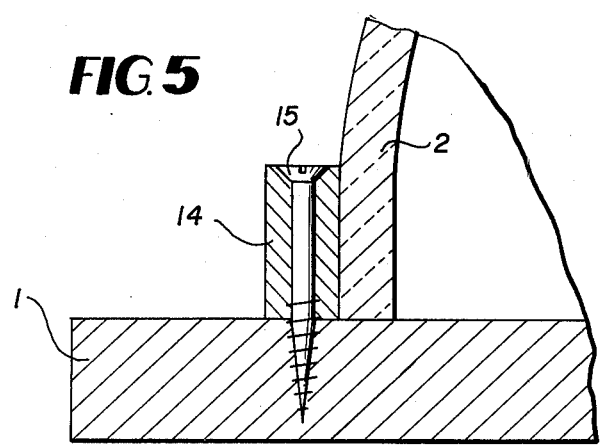
FIG. 5 is a sectional view taken along lines 5—5 of FIG. 1.
Figure 6:
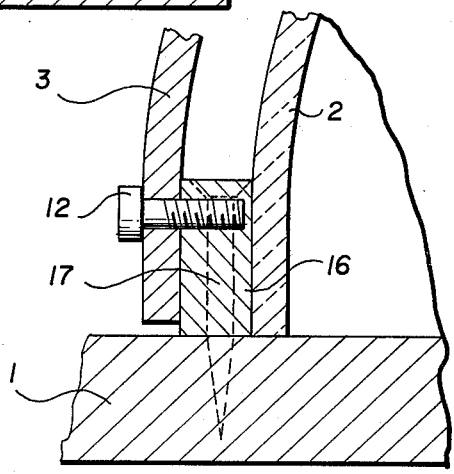
FIG. 6 is a sectional view taken along lines 6—6 of FIG. 1.

Referring to the drawings now, wherein like reference numerals refer to like parts throughout the several drawings, reference numeral 10 is directed to the apparatus according to the present invention.

This apparatus is defined as being provided with a substrate 1 which supports a pair of gyroscopes through pedestals 11 which are secured into the substrate 1. The pedestals 11 supports upstanding shaft members 9 which serve to form a rotational axis about which the gyroscope 7 can precess due to external stimuli as will be defined hereinafter. Towards this end, a gimbal 8 interconnects the gyroscope to the shaft 9.

In order to isolate the interior compartment, which serves as the testing site, from the external environment, so as to negate the effects of wind, humidity, etc. a bell jar 2 is caused to overlie the pair of gyroscopes, and the bell jar is constrained to remain thereon by means of an arcuate strap 3 provided with a thumb screw 4 having a threaded section 6 threadedly disposed through the arcuate strap 3 and terminating in a pressure surface 5 which is juxtaposed to the bell jar 2 and secured thereagainst. The arcuate strap 3 is pivoted as at 12, and the pivot 12 finds support in the substrate 1 by block element 16 which is threadedly fastened to the substrate by screws 17. Further constraints for the bell jar include chock elements 14 fastened to the substrate diametrially opposed from the arcuate strap by further screws 15 as best seen in FIG. 1 and in section in the ensuing figures.

The substrate 1 is grounded as at 13 to discharge any static electricity which may exist.

In use and operation, each gyroscope is rotated in opposed directions, the bell jar is affixed securely thereto, and an atomic or hydrogen blast is actuated at a distance remote from this apparatus. After the bomb blast, the gyroscopes are studied to see if precession has occured and whether the new position of the gyroscopes is varied as a function of the bomb blast. Since the bell jar does not constrain the shaft 9 of the gyroscope, and the bell jar serves to deflect any percussive effect of the blast, the results of the test will reveal that the tremendous energy which is released upon such a blast has influenced the gravity and therefore the rotational axis of the gyroscopes.

Having thus described the invention, it should therefore be apparent that numerous structural modifications are contemplated as being a part of this invention as specified hereinabove and as defined hereinbelow by the claims.

What is claimed is:

1. In a testing apparatus the combination comprising a substrate, a pair of gyroscopes each provided with shaft means supporting said gyroscope on said substrate, and a bell jar overlying and spaced from said gyroscopes, and means to affix said bell jar to said substrate whereby said gyroscopes are free to precess and said bell jar isolates said gyroscopes from the environment.

2. The device of claim 1 in which said gyroscopes are mounted on said substrate by means of pedestals, supported in said substrate which serve to support said shaft means, which carry gimbals within which said gyroscopes are housed.

3. The device of claim 2 in which said means for affixing said bell jar include an arcuate strap pivotably supported on said substrate and oriented so as to overlie a major portion of said bell jar, and a thumb screw extending from said arcuate strap to said bell jar whereby tightening said thumb screw secures and fastens said bell jar.

4. The device of claim 3 in which said substrate is grounded to discharge any static electricity.

5. The device of claim 4 in which a pair of chocks are provided diametrically opposed from said arcuate strap on said substrate to further constrain said bell jar.

* * * * *